United States Patent Office 3,439,471
Patented Apr. 22, 1969

3,439,471
PACKAGING APPARATUS
George Howard Kraft, Wilmette, Ill., assignor to National Dairy Products Corporation, Chicago, Ill., a corporation of Delaware
Filed May 17, 1966, Ser. No. 550,681
Int. Cl. B65b 9/12, 7/06, 51/26
U.S. Cl. 53—182                               8 Claims

ABSTRACT OF THE DISCLOSURE

A packaging apparatus is provided which includes a delivery conveyor and a take-off conveyor spaced from each other and defining a gap therebetween, sealing means disposed at the gap, and means in addition to the sealing means disposed adjacent the gap for advancing units to be packaged across the gap at a constant speed.

---

The present invention relates generally to packaging apparatus and, more particularly, is directed to an improved apparatus for packaging units carried in spaced relationship within an elongated tube of wrapping material.

In certain apparatus for packaging units such as, for example, blocks or stacks of slices of cheese, the units are arranged in aligned and spaced relationship and are enclosed in an elongated tube formed of wrapping material. The tube of wrapping material within which the units are supported is then sealed and severed intermediate adjacent units to form completed packages. In such apparatus, the sealing is accomplished by means of a pair of cooperating heated sealing heads, one of which projects from the periphery of each of a pair of rotating shafts positioned above and below the tube extending transversely with respect to the path of travel of the tube. As the shafts rotate, the sealing heads are periodically brought into cooperating relation with each other to simultaneously engage opposing walls of the tube and heat seal the walls together. The seals are applied at fixed intervals along the tube, the length of the intervals depending upon the length of the units being packaged.

In order to effect proper sealing, it is necessary that the sealing heads travel at the same speed as the tube of packaging material during the sealing operation. However, depending upon the length of the units being packaged and the length of the path traversed by the sealing heads during each revolution of the shaft, the shafts upon which the sealing heads are mounted do not necessarily rotate at a constant speed. For example, and as is frequently the case, when the length of the path traversed by a sealing head is substantially greater than the distance desired between the seals, the sealing head must first travel at the same speed as the packaging material during sealings, must accelerate to a speed substantially greater than that of the packaging material, and must then decelerate to the speed of the packaging material before again engaging the material to form a succeeding seal. This rapid acceleration and deceleration of the sealing head imposes a strain on the apparatus and limits the speed at which it can be operated.

When the sealing elements are in contact with the tube during the sealing operation, their movement tends to advance the leading end portion of the tube through the apparatus. When the sealing elements are out of contact with the tube, the tube rests upon the outer surface of the lower shaft and, due to the rapid rotation of the shaft during acceleration, and the frictional drag between the tube and shaft, advancement of the tube is likewise effected.

The limitations on the speed of operation of the machine due to the rapid acceleration and deceleration of the shafts which support the sealing elements cannot be remedied solely by adding a second sealing element to each shaft in a position diametrically opposed to the position of the first element on the shaft since the surface speed of that portion of the shaft upon which the tube rests between sealing operations will then be reduced to a value below that necessary to insure the movement of the forward end portion of the tube through the sealing station at the same speed as the immediately succeeding portion of the tube. This slowing of the forwardmost portion would cause bunching of the tube in the sealing station and a failure of the sealing elements to register with the portion of the tube located between the units being packaged.

It is an object of the present invention to provide an improved packaging apparatus for efficiently and rapidly packaging units arranged in spaced relation within an elongated tube formed of wrapping material.

Other objects and advantages will become readily apparent from the following detailed description and accompanying drawings wherein.

Figure 1:
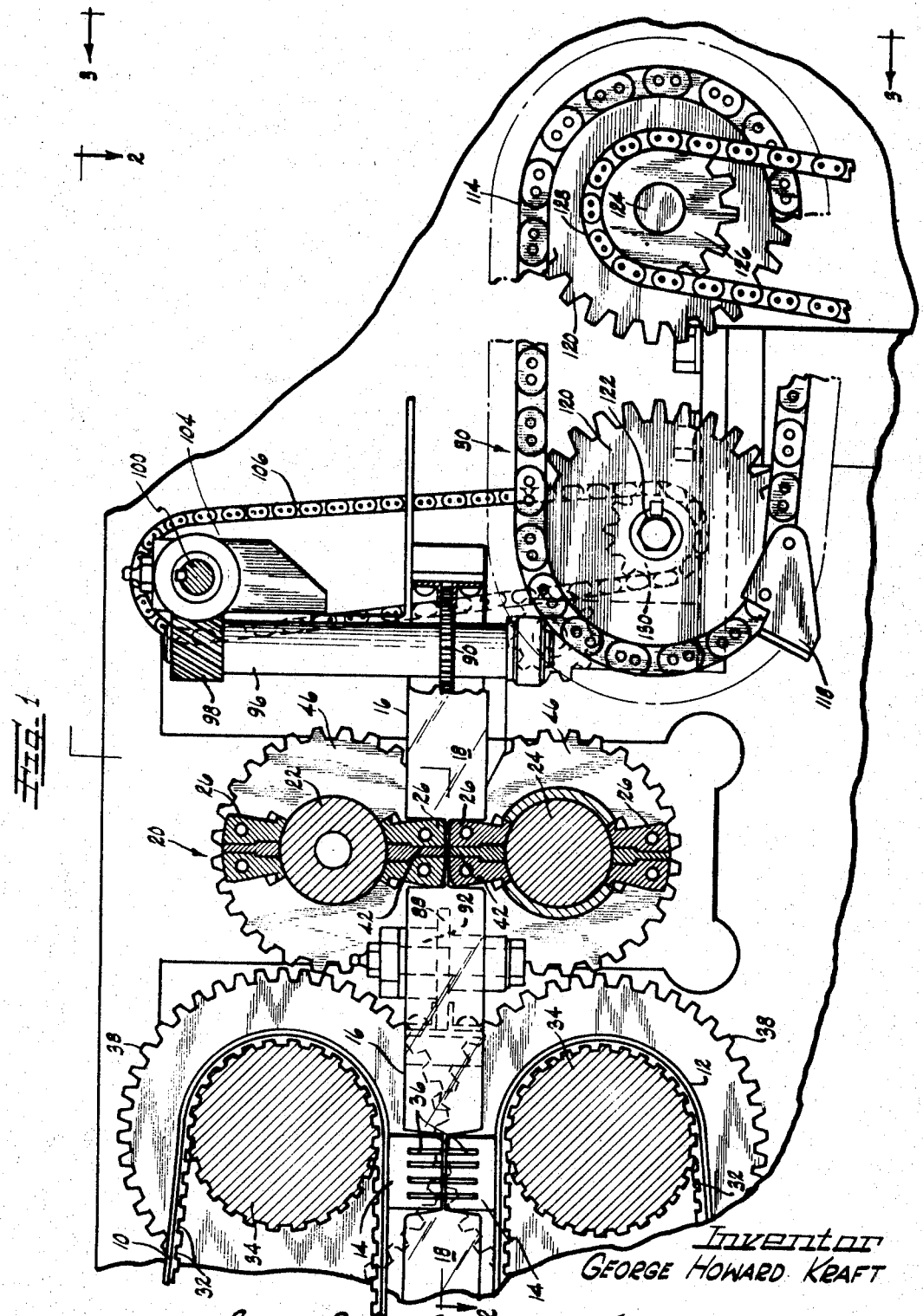
FIGURE 1 is a fragmentary sectional side elevational view taken parallel to the longitudinal centerline of an apparatus showing various of the features of the present invention.

While not shown in its entirety in the accompanying drawings, an apparatus such as that to which the present invention is directed receives a plurality of units such as blocks or stacks of slices of cheese and delivers them in aligned, spaced relationship to a wrapping station where they are continuously enclosed within an elongated tube formed of a suitable wrapping material, preferably a flexible, thermoplastic, readily heat sealable sheet material. As the tube within which the units are carried is advanced past the wrapping station, it is engaged by a pair of complementary, vertically spaced upper and lower conveyor belts 10 and 12, each of which is provided with a plurality of lugs 14 spaced from one another along the length of the belt a distance closely approximating the distance between the spaced units in the tube. As the tube, which is designated by the numeral 16 in the drawings, is advanced, it is engaged between the units 18 by the lugs 14, collapsing the tube preparatory to the sealing thereof.

A sealing and severing mechanism 20 is located adjacent the exit end of the lug belts 10 and 12 and engages the collapsed portions of the tube between adjacent units to seal and sever the walls of the tube and form completed packages. The sealing and severing mechanism comprises a pair of rotated shafts 22 and 24, each of which carries a pair of sealing and severing heads 26 located at diametrically opposed positions on the shafts. The forwardmost portion of the tube is advanced from the lug conveyor to and past the sealing and severing mechanism by a transfer conveyor 28 which engages each of the lateral sides of that portion of the tube. A take-off conveyor 30 is provided to receive the finished packages from the transfer conveyor mechanism 28 and deliver them to a further processing station (not shown).

As previously mentioned, the lugs 14 of the lug belts 10 and 12 collapse but do not seal the tube 16 between the spaced units 18 within the tube to facilitate subsequent sealing by the sealing and severing mechanism 20. These belts, only a portion of each of which is shown in the drawing (FIGURE 1), are described in detail in U.S. Letters Patent No. 3,090,174. Basically, each is in effect a timing belt formed of a flexible material such as rubber or the like and provided with transverse grooves 32 on its inner surface which facilitate positive cooperative engagement between the belts and splined shafts 34 upon which the belts are supported and by means of which they are driven. Affixed to the outer surface of each belt and projecting in a direction normal to such surface are the lugs 14 which are spaced from each other a distance closely approximating the distance between the units to be packaged in the tube, as previously mentioned. Each lug is provided with slits 36 which extend inwardly toward the belt from the outer surafce of the lug and terminate short of the belt. The slits facilitate flexing of the lug.

The splined shafts 34 which support the belts 10 and 12 are themselves supported above and below the tube in horizontal disposition in suitable bearings (not shown). Preferably, the lower run of the upper belt is inclined upwardly and readwardly slightly toward its inlet end to facilitate a gradual collapsing of the tube, as set forth in the above-mentioned patent.

Each shaft 34 shown in FIGURE 1 has keyed adjacent one of its ends a gear 38. The gears 38 mesh with each other to thereby insure that both shafts will rotate in unison and, hence, that both belts will travel at the same speed. One of the shafts 34 in addition has keyed to it a sprocket 40 which receives a chain (not shown) by means of which the shafts 34 are driven.

In the operation of the lug conveyors 10 and 12, the lugs 14 are caused to travel with the tube 16 and to gradually collapse the tube between adjacent units while serving at the same time to advance the tube. After the initial engagement of the tube by the lugs but prior to the compleion of the collapsing in any given tube section, the side walls of the tube are preferably tucked inwardly by a suitable tucking mechanism, also shown in the aforesaid patent, to render the ultimate package more attractive and manageable. The collapsing of the tube retains the tucks in place.

Figure 2:
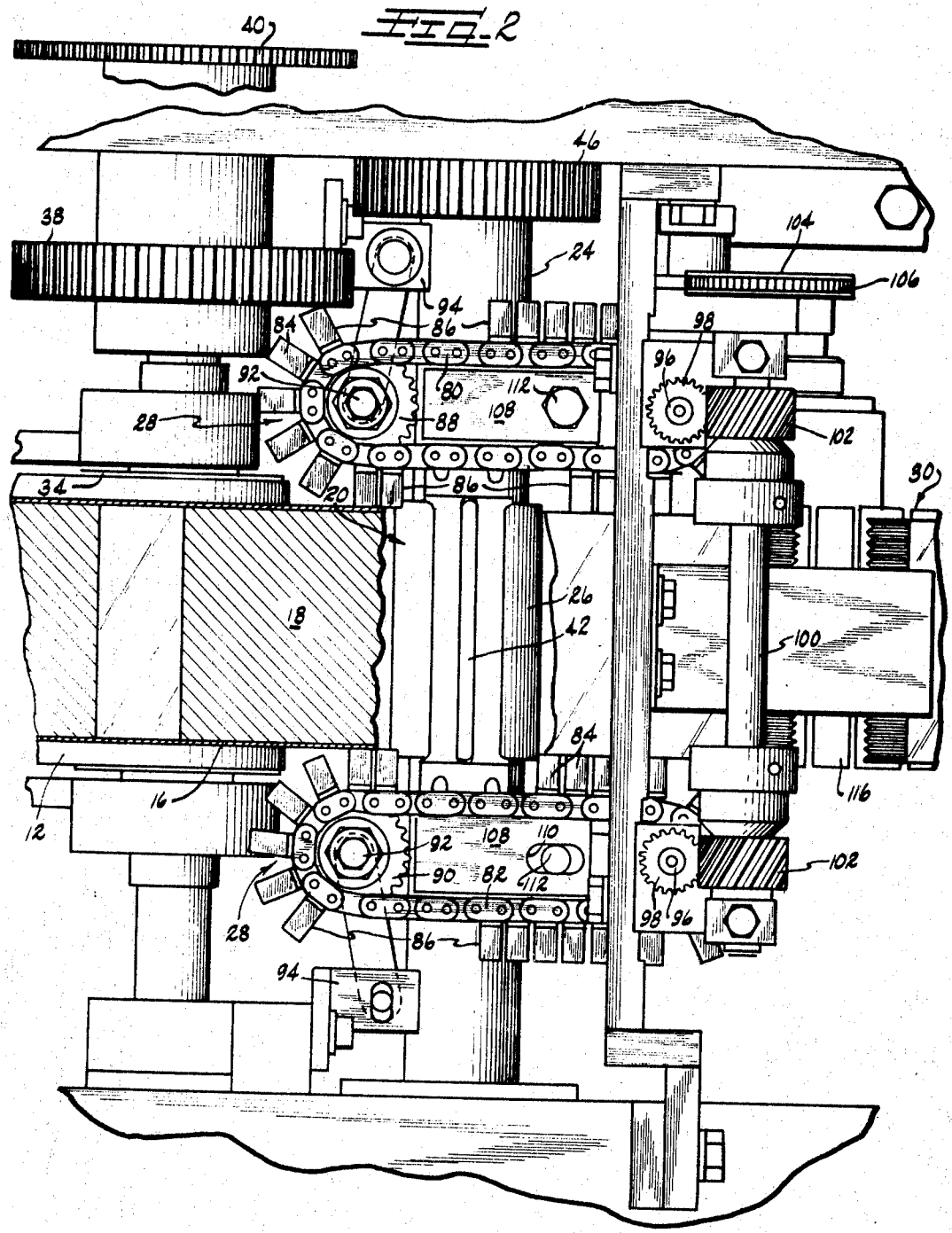
FIGURE 2 is a partially broken away fragmentary plan view taken generally along line 2—2 of FIGURE 1.

The sealing and severing mechanism 20 is disposed adjacent the delivery or exit end of the cooperating lug conveyors 10 and 12 and receives the tube 16 to seal, and also to sever, the tube at the collapsed area. The sealing and severing mechanism comprises the pair of rotatably mounted horizontally disposed shafts 22 and 24 which are positioned respectively above and below the tube path in vertical alignment with each other. In the illustrated embodiment, the shafts extend transversely across the tube path, and each carries the pair of diametrically opposed outwardly projecting heated sealing heads 26. A cutting blade 42 is mounted within each sealing head. The sealing heads cooperate with one another to simultaneously engage the collapsed portions of the tube as the shafts are rotated in unison. As a result of the engagement between the sealing heads and the walls of the tube, a sealing of the tube is effected. The cutting blades are so arranged within the sealing heads that a cutting or severing of the tube at the seal is accomplished substantially simultaneously with the formation of the seal. As can be seen in FIGURE 2, the sealing heads are somewhat wider than the transverse dimension of the tube so as to assure a complete sealing and severance across the tube.

The shafts 22 and 24 are carried in suitable bearings mounted on posts 44 provided at each side of the frame of the apparatus. Each shaft has mounted on it a gear 46, both gears being intermeshed so that the shafts will rotate in unison. In addition, the lowermost shaft 24 has mounted on it a helical gear 48 which is keyed to the shaft 24 but shiftable therealong to a limited extent for reasons which will become apparent shortly. The helical gear 48 meshes with a second helical gear 50 carried on a stub shaft 52 but not shiftable therealong. The second helical gear 50 also meshes with a third helical gear 54 carried on a second stub shaft 56, which shaft also carries a gear 58 which meshes with a pinion gear 60 carried on a shaft 62. The shaft 62 also carries a bevel gear 64 which meshes with a bevel gear 66 carried on a shaft 68 leading to another portion of the apparatus.

In order to effect proper sealing engagement of the cooperating sealing and severing heads and with the collapsed portion of the tube between adjacent spaced units 18, it is necessary that their engaging surfaces travel at the same speed as the tube during the sealing operation. However, when the circumferential distance between corresponding points on the tube engaging surfaces of the heads of each shaft is greater than the distance between corresponding points on adjacent units in the tube, the average tangential velocity of the tube-engaging surfaces of the sealing and severing heads must be greater than the linear speed of the tube so as to present the heads in properly timed relation for a successive sealing and severing cycle. Accordingly, although each shaft makes one-half revolution for each unit being packaged, means are provided for varying the speed of rotation of the shafts during each one-half revolution thereof by effecting shifting of the helical gear 48, previously referred to, which is slidably mounted on the shaft 24.

More specifically, a barrel cam 70 is slidably mounted on the shaft 24 adjacent the helical gear 48 and is fixed to this gear adjacent the outer surface thereof. A rib 72 projects from the outer surface of the barrel of the cam 70 to define a pair of parallel camming surfaces, one on each side of the rib, which are engaged respectively by each of a pair of horizontally spaced rollers 74 and 76 mounted in stationary horizontally spaced positions on a bracket 78 for rotation about vertical axes. The bracket 78 is suitably secured to an adjacent post 44 to which the shaft bearings are mounted.

As the shaft 24 is rotated, the barrel cam 70 also rotates by virtue of being secured to the helical gear 48 which, in turn, is keyed to the shaft 24. The interengagement between the rib 72 of the cam 70 and the stationary rollers 74 and 76 causes shifting movement of the cam on the shaft and, thus, shifting movement of the helical gear 48 on the shaft relative to the non-shiftable helical gear 50. Such relative shifting movement between the engaging and rotating helical gears causes a variance in the speed of the shifted gear during the movement. In the illustrated embodiment, the barrel cam is positioned and shaped so as to cause movement during that portion of a revolution of the shaft 24 in which the sealing and severing heads are not in engagement with the tube. It should be clear, of course, that since the upper shaft is driven by the lower shaft by virtue of the interengagement of the gears 46, the upper shaft undergoes the same variation in speed as the lower.

It will be appreciated that the engagement between the tube and the sealing heads during the sealing operation also serves to advance the forwardmost portion of the tube, i.e., that portion of the tube which extends between the lug conveyor and the sealed and severed end of the tube. However, absent other means, there is not sufficient positive advancing movement imparted to the tube when the contact between the tube and the sealing heads cease to advance the forwardmost portion of the tube a distance approximately equal to the length of one package during each cycle.

As previously mentioned, in apparatus where only a single sealing head is provided on each shaft, sufficient forward impetus is imparted to the tube by the engagement between the tube and the portion of the lower shaft intermediate the side edges of the sealing head. Provision of two sealing heads, however, substantially reduces the speed of the shaft during the interval between sealing operations so that the impetus provided by the aforesaid engagement is not sufficient to advance the tube the degree required. Some advancement of the forwardmost portion of the tube is effected by the lug conveyor which pushes the forwardmost portion along. However, this pushing action causes a foreshortening of the previously collapsed sections of the tube to such an extent as not to allow sufficient clearance for the sealing heads.

In the illustrated embodiment, these problems are overcome by the provision of the transfer conveyor 28 which engages the lateral sides of the tube after it leaves the lug conveyors 10 and 12 and carries it to and past the sealing and severing mechanism 20. The transfer conveyor is in the form of a pair of endless roller chains 80 and 82, each of which has mounted thereon three sets of tube engaging lugs 84 which, in the preferred embodiment are metal, the sets being spaced from each other along the chain to provide gaps 86 therebetween. The gaps 86 accommodate the end edge portions of the sealing heads 26 which, as previously noted, are wider than the tube 16 and would otherwise interfere with the transfer conveyor which engages the lateral sides of the tubes. The gaps also accommodate the lugs 14 of the lug conveyors 10 and 12 at the area where the lugs 14 pass into proximity to the transfer conveyor.

Each chain of each transfer conveyor 28 is carried by a pair of horizontally spaced sprockets 88 and 90 supported intermediate a post 44 of the sealing and severing mechanism and the path of the tube. The sprocket 88 of each belt nearest the lug conveyors 10 and 12 rotates on a vertical stub shaft 92, the precise position of which can be adjusted through suitable movement of the adjusting link 94 to control the tension in the chain. The sprocket 90 at the opposite end of each transfer conveyor rotates about a vertical shaft 96 which extends upwardly above the level of the upper shaft 22 of the sealing and severing mechanism and is provided with a gear 98 at its upper end. A shaft 100 is supported in horizontal disposition by the post 44 adjacent the upper ends of the vertical shafts 96 of the transfer conveyors and carries a pair of worm gears 102 which mesh with the gears 98 at the upper ends of the shafts 96. Thus, as the horizontal shaft 100 is rotated, the vertical shafts 96 of the conveyors are driven to effect traveling movement of the conveyor chains and lugs.

Driving movement of the shaft 100 on which the worm gears are mounted is accomplished by means of a sprocket 104 mounted on the shaft 100 and connected by means of a chain 106 to a sprocket driven through the take-off conveyor 30, hereinafter described. This connection assures a timed relationship between the transfer and take-off conveyors.

In order to assure positive engagement between the lugs 84 and the lateral side walls of the tube 16, a pressure block 108 is provided within the loop formed by each conveyor chain. This block resists deflection of the midportion of the chain and insures a pressure between the lugs 84 and the lateral side walls of the tube. The block 108 is provided with a slot 110 which receives the shank 112 of a bolt extending downwardly through the block and threaded into the frame. The bolt guides the block for movement parallel to the direction of movement of the tube.

In operation, the transfer conveyor 28 engages the tube as it leaves the lug conveyors 10 and 12 and remains in engagement with it until it is not only sealed but severed from the remainder of the tube. The engagement of the tube by the transfer conveyor is effective to maintain in place the tuck provided during the collapsing of the tube by the lug conveyors. In addition, the transfer conveyor effects continuous advancement of the tube during the sealing of the tube.

It will be noted in FIGURE 1 that the portions of the wrapping material adjacent the ends of the units as they emerge from the lug conveyors are slightly peaked or pointed, i.e., the wrapping material extends at an angle from each the upper and lower surface of the unit to the collapsed area. It is desirable, however, that the wrapping material be disposed as close as possible to the unit being packaged or, more specifically, that there be a "tight wrap" adjacnt all surfaces of the packaged unit. To accomplish this objective, the transfer conveyor is caused to travel at a slightly slower speed than the lug conveyor, thereby relaxing any tension there may be on the peaked portions of the wrapping material and, incidentally shortening slightly the distance between units. In addition, the sealing head is formed so as to be somewhat wider than the lugs 14 of the lug conveyor, thereby drawing any slack material between the units down into the seal.

Figure 3:
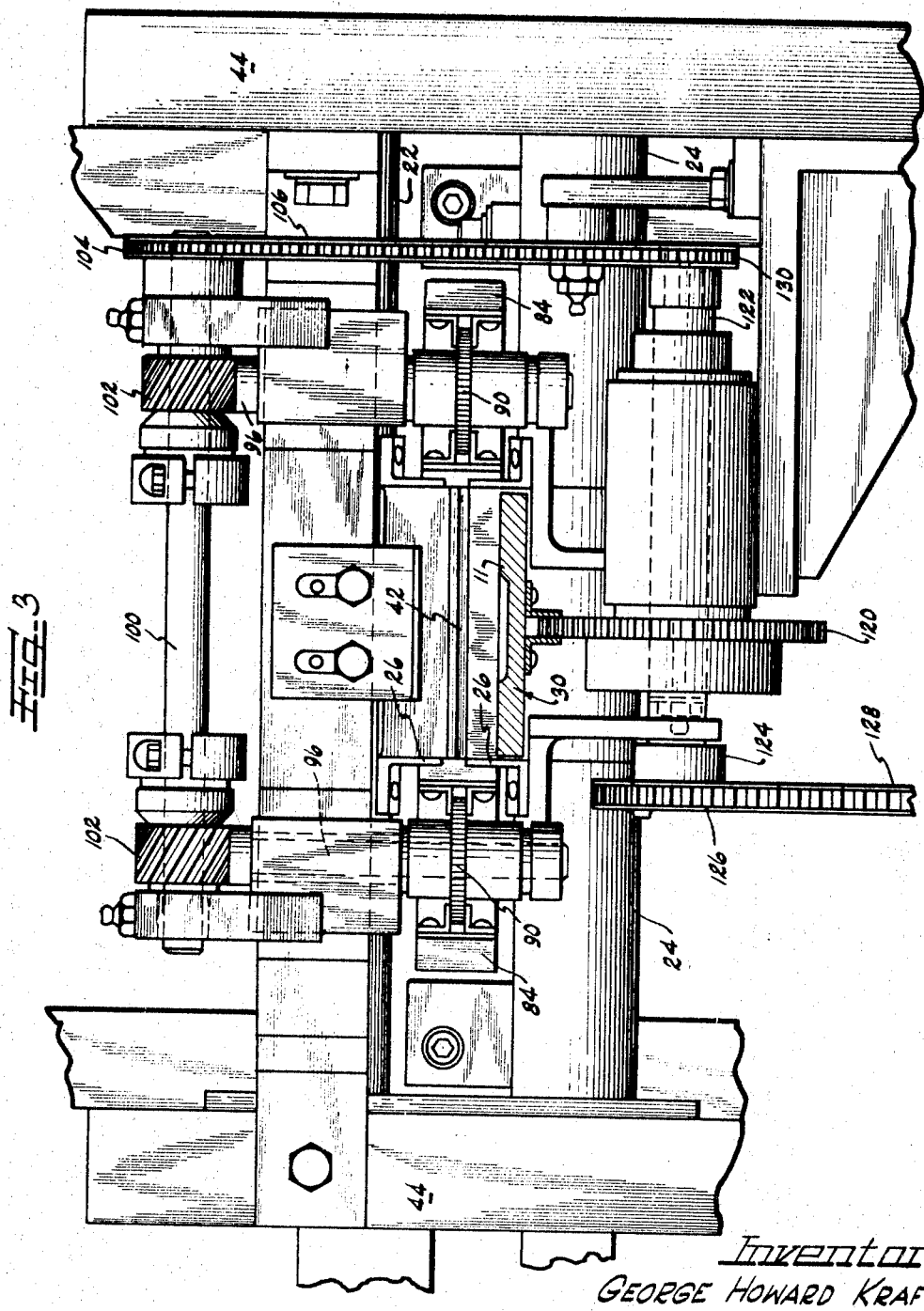
FIGURE 3 is a fragmentary end elevational view, partially in section, looking in the direction of the arrows 3—3 of FIGURE 1.
Figure 4:
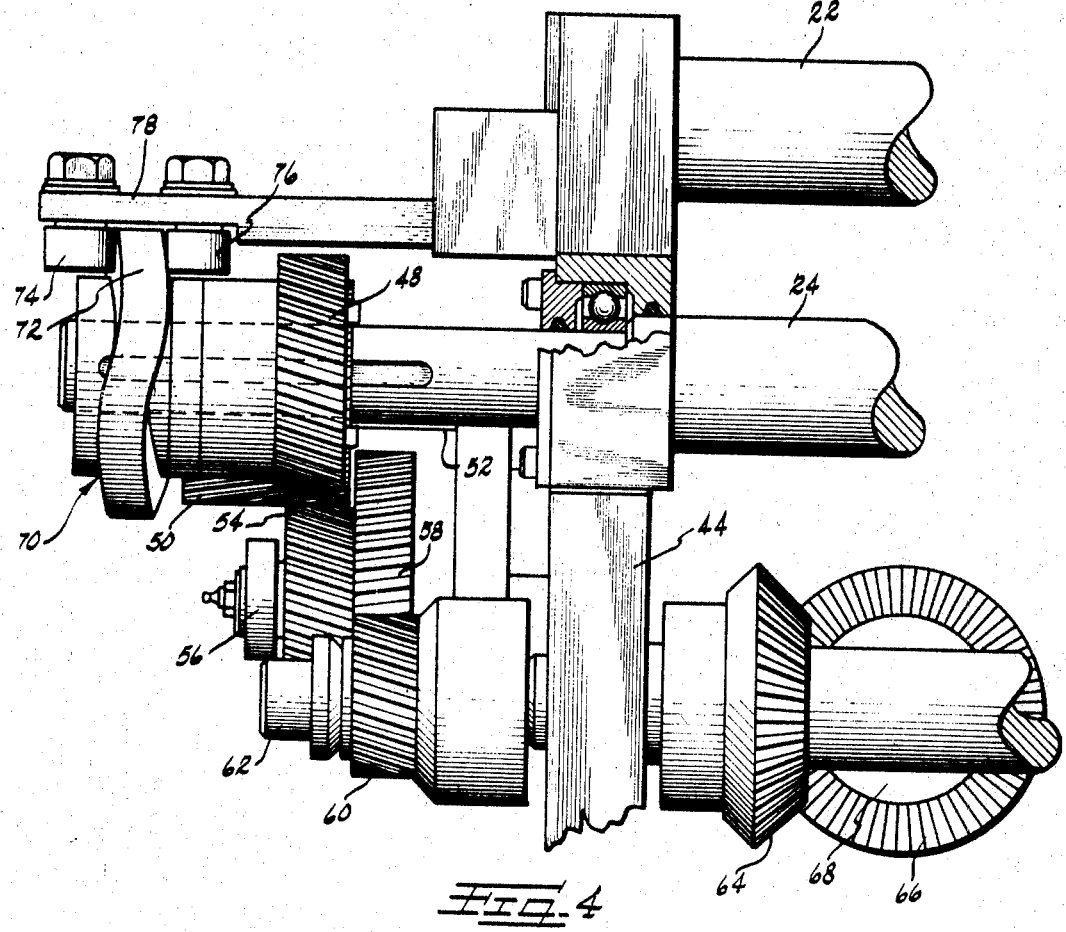
FIGURE 4 is an enlarged fragmentary end elevational view showing in detail a portion of the apparatus FIGURE 1.

The finished packages are delivered by the transfer conveyor 28 to the take-off conveyor 30 located immediately adjacent thereto along the path of tube advance. The take-off conveyor comprises a chain 114 having mounted thereon a plurality of cleats 116, shown specifically in FIGURES 2 and 3 but only diagrammatically in FIGURE 1. Periodically along its length the conveyor carries an upstanding spacer 118 which insures predetermined positioning of the packages on the conveyor to facilitate an orderly removal therefrom.

The chain 114 of the take-off conveyor 30 is mounted on sprockets 120 carried on horizontally spaced shafts 122 and 124. The forwardmost shaft 124 also carries a sprocket 126 which is connected by a chain 128 to the drive mechanism of the apparatus. The rearwardmost shaft 122 also carries a sprocket 130 which is connected by the chain 106 which also is engaged by the sprocket 104. Thus, the take-off conveyor and transfer conveyor are drivingly interconnected, as previously set forth. In a preferred embodiment, the sprocket 130 of the take-off conveyor has fewer teeth than the sprocket 104 of the transfer conveyor so that the take-off conveyor travels at a greater speed than the transfer conveyor, thereby effecting a spacing between the packages on the take-off conveyor, as shown in FIGURE 2.

The drive mechanism for the apparatus includes a variable speed constant troque motor (not shown) which is connected through a gear train (not shown) to various of the components of the apparatus. More specially, the shaft 34 of the lowermost lug conveyor 12 is connected directly to the gear train so as to be driven at a given speed. The shafts 22 and 24 of the sealing and severing mechanism 20 are interconnected through meshing gears 46 and are ultimately driven through gears 48, 50, 54, 58 and 60 by the shaft 62 which is also connected to the gear train. The transfer conveyors 28 are driven through rotation of shaft 100 which is in turn connected via chain 106 to the take-off conveyor. The take-off conveyor is, in turn, driven by the shaft 124 which is also connected to the gear train.

In operation, the wrapping material and units to be packaged are fed into the apparatus and the wrapping material is caused to envelope the units and form a tube enclosing the units. The tube is advanced to and by the lug conveyors 10 and 12 which collapse the tube between the units, tucking of the tube being accomplished also at this point.

Upon leaving the lug conveyors, the tube is engaged by the transfer conveyor which carries it at a constant speed past the sealing and severing mechanism and delivers it to the take-off conveyor. The sealing and severing mechanism effects sealing and severing of the tube between units by means of sealing and severing heads which rotate at a varying speed during each cycle.

While the present invention has been shown and described with respect to one specific structural embodiment thereof, it should be apparent that various modifications may be made in that embodiment without departing from the scope of the invention.

Various of the features of the invention believed to be novel are set forth in the following claims.

I claim:

1. In a packaging apparatus wherein a plurality of units to be packaged are carried in spaced relation enclosed within an elongated tube formed of wrapping material continuously advanced along a predetermined path, a delivery conveyor for advancing said enclosed units along said path, said delivery conveyor having an entry end and a discharge end, a take-off conveyor for advancing said enclosed units along said path, said take-off conveyor having an entry end and a discharge end and being arranged with its entry end in line with the discharge end of said delivery conveyor but spaced therefrom to define a gap therebetween, means disposed at said gap for sealing the tube transversely forwardly and then rearwardly of each enclosed unit as it crosses said gap so as to isolate such units from the remaining units in the tube and for severing the tube at each such seal so as to successively separate the isolated units individually from the tube, and means in addition to said sealing and severing means disposed adjacent said gap for engaging each enclosed unit to be separated so as to support and advance it across said gap at a constant speed until it reaches a position in which it is supported and advanced by said take-off conveyor.

2. An apparatus in accordance with claim 1, wherein said tube engaging means engages surfaces of said tube which are generally transverse to those contacted by said sealing means.

3. An apparatus in accordance with claim 1, wherein said tube engaging means includes a pair of opposed endless driven belts each of which is provided with outwardly projecting lugs defining surfaces engageable with said tube, and wherein spaces are provided between sets of said lugs to accommodate portions of said sealing means therebetween.

4. An apparatus in accordance with claim 1, wherein the path of the elongated tube is generally horizontal, and wherein said sealing means comprises a pair of rotatably mounted, horizontally disposed vertically aligned shafts positioned respectively above and below said path in planes transverse to said path, said shafts being rotated in unison, at least one of said shafts carrying at least two sealing elements projecting from the periphery of said shaft in circumferentially spaced relation to each other.

5. An apparatus in accordance with claim 4, wherein the speed of rotation of said shafts varies during each revolution thereof.

6. An apparatus in accordance with claim 4, wherein at least two sealing elements project from the periphery of each of said shafts in circumferentially spaced relation to each other, each sealing element being adapted to cooperate with a sealing element of the other shaft.

7. An apparatus in accordance with claim 1, wherein said tube engaging means engages that portion of the tube enclosing each unit during the sealing of the tube both forwardly and rearwardly of the unit.

8. An apparatus in accordance with claim 1, wherein means are provided for advancing the tube and collapsing same intermediate adjacent units prior to engagement thereof by said sealing means or by said tube engaging means, said advancing and collapsing means being adapted to advance the tube at a speed slightly greater than that effected by said tube-engaging means so as to reduce the distance between the units and insure an intimate engagement between the wrapping material and the unit adjacent the seal.

References Cited

UNITED STATES PATENTS

| | | | |
|---|---|---|---|
| 2,770,936 | 11/1956 | Clark | 53—180 |
| 2,803,100 | 8/1957 | Aalseth | 53—182 |
| 3,090,174 | 5/1963 | Kraft | 53—182 X |
| 3,237,371 | 3/1966 | Gerlach | 53—182 |
| 3,325,966 | 6/1967 | Bruce et al. | 53—182 X |

THERON E. CONDON, *Primary Examiner.*

R. L. FARRIS, *Assistant Examiner.*

U.S. Cl. X.R.

53—373